May 9, 1967 B. E. DENTON 3,319,111

LINEARITY CORRECTION CIRCUIT

Filed Feb. 10, 1964

INVENTOR.
BETHEL E. DENTON
BY
W. H. Sprague
ATTORNEY

United States Patent Office 3,319,111

Patented May 9, 1967

3,319,111

LINEARITY CORRECTION CIRCUIT

Bethel Edward Denton, Robards, Ky., assignor to Radio Corporation of America, a corporation of Delaware Filed Feb. 10, 1964, Ser. No. 343,514
8 Claims. (Cl. 315—27)

This invention relates to a linearity correction circuit arrangement for use with an electromagnetic electron beam deflection system. The invention is related more particularly to an improvement in a resonant linearity correction circuit arrangement.

In an electromagnetic deflection system such as is utilized in the horizontal deflection stage of a television receiver, it is conventional to provide linearity correction means for establishing a linear trace of the electron beam at a viewing face of a cathode ray tube. An improved form of a linearity correction means provides an L–C network which is coupled to a winding of an output transformer and forms a series resonant circuit loop with a segment of the transformer winding. The loop is resonant at a frequency $f_r$ which is substantially equal to the horizontal deflection frequency $f_h$. An electron beam deflection winding is coupled between the L–C network and a terminal of the transformer winding. Means periodically excite the transformer at a frequency $f_h$ and cause a current of generally sinusoidal waveform to circulate in the transformer output circuit and a current of generally sawtooth waveform to flow in the deflection winding. The circulating current alters the sawtooth current to provide a deflection current waveform which effects the desired linearity correction.

For proper linearity correction, the resonant frequency of the circuit loop should be maintained at the initially established value $f_r$. Deviations from this frequency can occur when the electrical characteristics of the loop components vary as a result, for example, of environmental operating conditions. This detuning causes the amplitude and phase of the circulating loop current to vary with respect to the sawtooth current, and to cause raster distortion. For maintaining the established resonant frequency $f_r$, it has been proposed to utilize components having close tolerance. Close tolerance components are relatively expensive and disadvantageously increase the cost of the circuit arrangement.

Accordingly, it is an object of the present invention to provide a linearity correction circuit of the type referred to having a relatively inexpensive means for reducing the adverse affects which accompany a detuning of the resonant circuit loop.

Another object of the present invention is to provide relatively inexpensive means for reducing undesirable variations in the amplitude and phase which accompany detuning of the resonant loop.

A further object of the invention is to provide a linearity correction circuit arrangement adapted for utilizing relatively relaxed or loose tolerance low-cost components in the resonant circuit loop.

Cathode ray tubes having relatively large electron beam ations in the amplitude and phase which accompany deflecting the electron beam than do tubes of smaller deflection angles. Non-linearities of beam trace in the former type of tube are pronounced in view of the large angle through which the beam is deflected and the accompanying higher energy levels. A resonant linearity correction circuit for use with a cathode ray tube of this type is accordingly required to circulate a sinusoidal current of large amplitude in order to provide effective linearity correction. Consequently, slight detuning of the correction circuit loop at this higher current level causes raster distortion.

A further object of the invention is to provide a resonant linearity correction circuit of the type referred to for use with a cathode ray tube having a relatively large deflection angle.

Another object of the invention is to provide a linearity correction circuit arrangement which reduces the raster distortion accompanying detuning of the resonant circuit loop and which is adapted to operate with relative efficiency at higher deflection energy levels.

In accordance with the present invention, an L–C linearity correction network is coupled to a winding of a deflection output transformer. The network is arranged to form a circuit loop with an electrical impedance of the transformer winding across which the network is coupled and is adapted to cause series resonance of the loop at a frequency $f_r$. The frequency $f_r$ is substantially equal to the excitation frequency of the transformer, $f_h$. An electron beam deflection winding is coupled between the network and the transformer winding. The circuit loop includes a branch having an impedance adapted for reducing the Q of the loop circuit. The reduced Q of the circuit reduces the effect of deviations in the electrical characteristics of the different impedances in the loop on the amplitude and phase of a current circulating in the loop and thus eliminates the need for relatively close tolerance components.

In accordance with another feature of the present invention, means are provided for adjusting the phase and amplitude of the circulating loop current with respect to the sawtooth current. An adjustable reactive impedance is coupled in a branch of the circuit loop. This arrangement provides a means for initially establishing a phase relation and amplitude to affect desired linearity correction and serves to adjustably re-establish these relations when variations in the electrical characteristics of circuit components occur.

These and other features of the present invention will become apparent with reference to the following specification and drawings, in which.

Figures 1, 2, 3, 4:
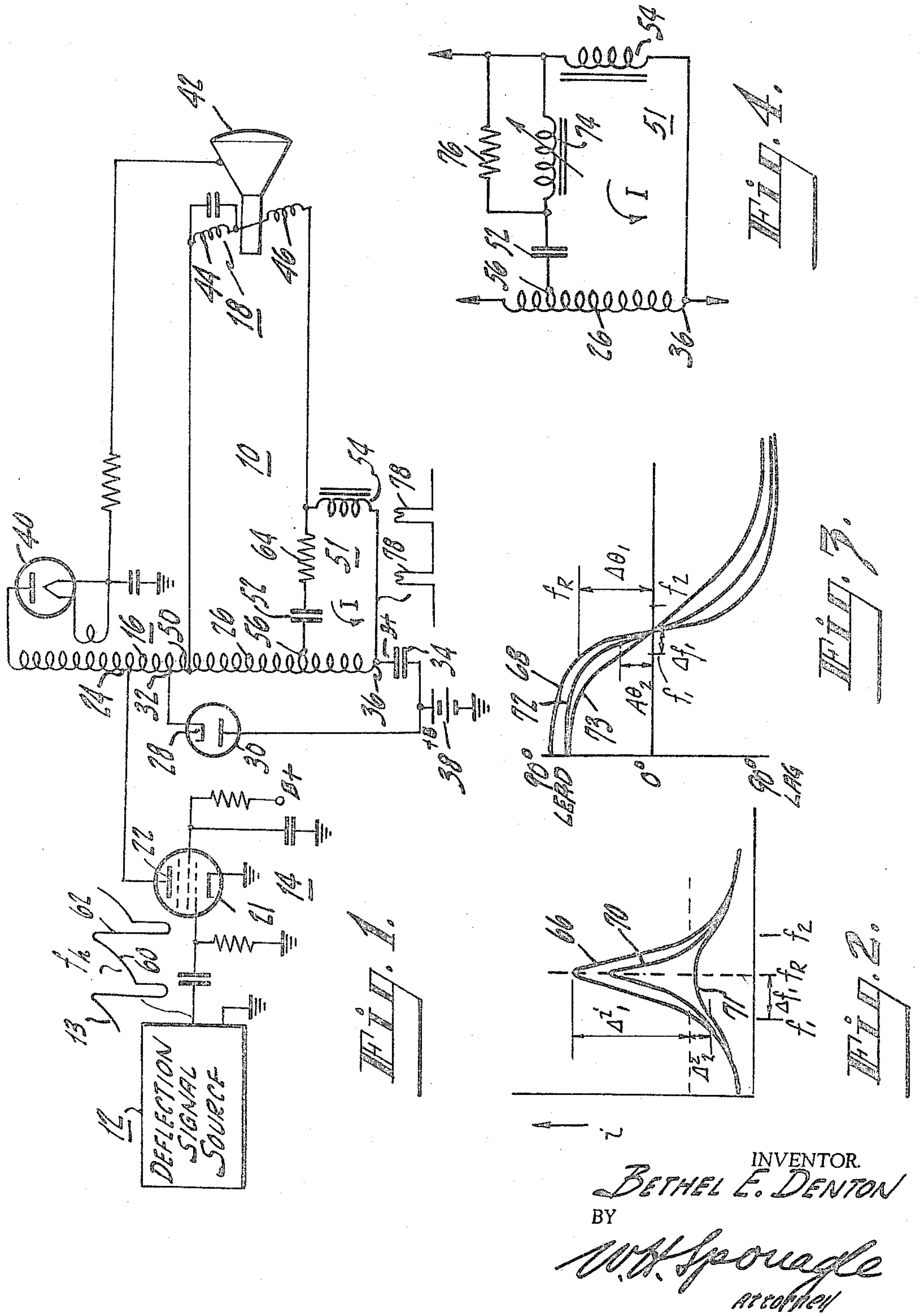
FIGURE 1 is a diagram, partly in block and partly in schematic form, illustrating an embodiment of the present invention.
FIGURE 2 is a diagram illustrating the variation in the current circulating in the resonant circuit loop for different values of circuit Q.
FIGURE 3 is a diagram illustrating the variation in phase of circulating loop current for different values of circuit Q.
FIGURE 4 is a partial schematic diagram of another embodiment of the linearity correction circuit of FIGURE 1.

Referring now to FIGURE 1, a deflection circuit arrangement is illustrated. In order that the present invention may be fully appreciated, a brief description of the deflection system will be given. The deflection system comprises a source 12 of deflection signal of desired waveform 13, a drive amplifier 14, an output transformer 16, and a deflection winding 18. The waveform generator 12 comprises a conventional relaxation oscillator having an output wave-shaping network. It may, for example, represent and include the stages in a television apparatus necessary to produce the waveform. These stages are known and further elaboration is believed unnecessary. The waveform 13, which has a frequency of repetition $f_h$, is R–C coupled to the driver amplifier.

The amplifier 14 includes a conventional pentode amplifying device 21 having an anode electrode 22 connected to a terminal 24 of a winding 26 of the output transformer 16. The deflection system includes a conventional power recovery circuit having an efficiency diode 30 connected to a terminal 32 of the winding and a B-boost capacitor 34 connected to a terminal 36 of the transformer winding. Direct current operating p-tential is provided for the amplifier by a source 38 and is connected to the diode 30 and B-boost capacitor 34. A conventional high-voltage power supply including a rectifier 40 and R–C filter network provides an accelerating voltage which is coupled to a cathode ray tube 42.

The deflection winding 18 includes windings 44 and 46, which are disposed on opposite sides of a neck of the cathode ray tube 42 for establishing a periodically varying electromagnetic field. The winding 18 is coupled between an output terminal 50 of the transformer winding and a linearity correction network 51, which includes a capacitor 52 and an inductor 54. The capacitor 52, which is coupled to a terminal 56 of the transformer winding, and the inductor 54, which is coupled to the terminal 36, form with that segment of the transformer winding 26 between terminals 36 and 56 a series circuit loop I. The electrical characteristics of the capacitor 52 and the inductor 54 are selected to provide that this circuit loop I is series resonant at the frequency $f_r$ where $f_r$ is substantially equal to the frequency $f_h$. The frequency $f_r$ may deviate from the frequency $f_h$ in order to provide a circulating current having a phase adapted for providing the desired shaping of a trace segment of the deflection current.

In operation, the pentode amplifying device is periodically driven into anode current conduction during a latter portion of a trace segment 60 of the waveform 13. The periodically conducting pentode 21, along with the efficiency diode 30, causes a current of general sawtooth waveform to flow in the winding 18 and provides a desired electromagnetic beam deflection field. An electrical impulse is generated between terminals 36 and 56 of the winding 26 during a re-trace segment 62 of the deflection wavefrom 13. The circuit loop I is thus electrically excited and a current circulates in the loop which alters the sawtooth current flowing in the winding 18.

As indicated hereinbefore, deviations in the resonant frequency $f_r$ of the loop I cause an undesirable variation in the amplitude and phase of the current circulating in the loop and has an adverse effect on the raster. In order to maintain the established frequency of resonance, it has been proposed to use a capacitor 52 and an inductor 54 having close requirements on the tolerances of their electrical characteristics. These requirements add to the cost of the deflection system.

Circuit means comprising an impedance are coupled in a branch of the loop I for reducing the adverse effects resulting from deviations from the resonant frequency.

In FIGURE 1, a resistance 64 is coupled in a branch of the loop I between the terminal 56 and the inductor 54. The resistance 64 has an ohmic value which substantially reduces the Q of the circuit loop from a value of $Q_1$, provided by the inductor 54, the winding of the transformer, and the capacitor 52, to a lower value $Q_2$, and consequently reduces or minimizes the effect of the aforementioned circuit variations.

In further explanation of the circuit operation, reference is made to FIGURES 2 and 3. In FIGURE 2, which is a plot of the amplitude of circulating loop cirrent "*i*" flowing in the aforementioned branch vs. frequency, a curve 66 represents the selectivity of the circuit loop I when the capacitor 52, the inductor 54, and impedance of the segment of the winding are considered. These elements provide a Q characteristic referred to as $Q_1$. Variations in the electrical characteristics of the components of the circuit loop I will detune the circuit from its initially established resonant frequency $f_r$. This detuning may analogously be treated as the maintenance of loop resonant frequency and the deviation of the frequency of the exciting electrical impulse from a frequency $f_h$. In FIGURE 2, it can be seen that a detuning of the loop by a frequency deviation $\Delta f_1$ for the curve 66 causes a corresponding deviation in current $\Delta i$.

FIGURE 3 is a diagram illustrating the variation in the phase of circulating loop current as frequency of excitation varies. When FIGURE 3 is viewed in the analogous manner of FIGURE 2, it can be seen that a detuning of the resonant loop by a frequency deviation $\Delta f_1$ for the curve 68 causes a phase shift $\Delta\theta_1$. Linearity correction is dependent upon both the amplitude and phase of the circulating current. Hence, these changes in current $\Delta i_1$ and phase shift $\Delta\theta_1$ substantially vary the waveform of a sawtooth deflection current and causes raster distortion. When the Q of the circuit is reduced, as indicated by the curves 70 in FIGURE 2 and 72 in FIGURE 3, it can be seen that corresponding variations in loop current $\Delta i_2$ and phase $\Delta\theta_2$ are substantially reduced for an equivalent shift in frequency $\Delta f_1$. The reduced Q of the loop circuit, referred to as $Q_2$, is provided by coupling an impedance, such as the resistor 64 in the circuit loop. Although a loss in power efficiency of the loop circuit accompanies this lower Q, a relatively stable and low-cost linearity correction circuit is provided.

In cathode ray tubes of the type having relatively large electron beam deflection angles, as for example the type 19AYP4 having a deflection angle of 114°, a relatively high energy level is required for scanning the electron beam. A corresponding high amplitude current circulates in the linearity correction circuit loop to provide the high current level with reasonable power input to the loop, a low loss circuit is desirable. Because of a relatively high Q attending the low loss circuit, a small deviation in the resonant frequency of the correction circuit loop may result in raster distortion.

Adjustable means for varying the amplitude of the circulating current and the resonant frequency of the circuit loop may be provided. By virtue of this adjustable means, deviations from the resonant frequency can be corrected. FIGURE 4, which is a diagram of the deflection circuit loop, illustrates another embodiment of the invention which is particularly useful with cathode ray tubes having a relatively large deflection angle. The similar components of FIGURES 1 and 4 are referenced by similar numerals. The circuit includes an adjustable inductance 74 coupled in a branch of the circuit loop. Adjustment of the inductance varies the frequency of resonance of the loop and operates to re-establish the desired resonant frequency when deviations occur. In addition, the adjustment of the inductor functions to vary the amplitude of circulating current. Energy is coupled into the loop during the occurrence of pulses 78. These pulses, which charge capacitor 52, have a duration approximately equal to the flyback time. By varying the inductance 74, the time constant of the circuit and thus the energy coupled into the circuit during occurrence of the pulses can be adjusted. When the resistance of inductor 74 is larger than desired, a resistor 76 is shunted across the inductor 74 to lower the effective dissipative impedance of the circuit.

Although the resistor 64 of FIGURE 1 is illustrated as coupled in series with the capacitor 52 and the resistor 76 is illustrated as coupled in parallel with the inductor 74 in FIGURE 4, other arrangements of the resistor may work equally well. For example, it may, at times, be more desirable to couple the resistor in parallel with the capacitor or in series with the inductor 74 for adjusting the Q of the circuit.

Thus, a relatively simple and inexpensive arrangement has been described for reducing adverse affects caused by variation in the electrical characteristics of components in the resonant circuit loop. The necessity for providing relatively expensive, close-tolerance circuit loop components is avoided by such an arrangement.

While I have illustrated and described and have pointed out in the annexed claims certain novel features of my invention, it will be understood that various omissions, substitutions, and changes in the forms and details of the system illustrated may be made by those skilled in the art without departing from the spirit of the invention and the scope of the claims.

What is claimed is:

1. An electromagnetic deflection circuit arrangement comprising:
a deflection output transformer having a winding formed of a plurality of turns;
a linearity correction network having a capacitance and inductance coupled to said transformer winding and forming a circuit loop with a segment of the winding;
said capacitance and inductance adapted to provide series resonance of said circuit loop at a frequency $f_r$;
said capacitance, inductance and winding segment providing a characteristic circuit Q for the loop;
said network including circuit means comprising an impedance for decreasing the Q of the circuit loop from the value $Q_1$ to a lower value $Q_2$;
an electron beam deflection winding coupled between said transformer winding and linearity correction network;
circuit means coupled to said transformer winding and adapted for causing a periodic sawtooth current of frequency $f_h$ to flow in said deflection winding and a periodic current to flow in said resonant circuit loop;
said resonant frequency $f_r$ having a value substantially equal to the frequency $f_h$.

2. An electromagnetic deflection circuit arrangement comprising:
a deflection output transformer having a winding formed of a plurality of turns;
a linearity correction network having a capacitance and inductance coupled to said transformer winding and forming a circuit loop with a segment of the winding;
said capacitance and inductance adapted to provide series resonance of said circuit loop, at a frequency $f_r$;
said capacitance, inductance and winding segment providing a characteristic circuit Q for the loop;
said network including a resistor for decreasing the Q of the circuit loop from the value $Q_1$ to a lower value $Q_2$;
an electron beam deflection winding coupled between said transformer winding and linearity correction network;
circuit means coupled to said transformer winding and adapted for causing a periodic sawtooth current of frequency $f_h$ to flow in said deflection winding and a periodic current to flow in said resonant circuit loop;
said resonant frequency $f_r$ having a value substantially equal to the frequency $f_h$.

3. An electromagnetic deflection circuit arrangement comprising:
a deflection output transformer having a winding formed of a plurality of turns;
a linearity correction network having a capacitance and inductance coupled to said transformer winding and forming a circuit loop with a segment of the winding;
said capacitance and inductance adapted to provide series resonance of said circuit loop at a frequency $f_r$;
said capacitance, inductance and winding segment providing a characteristic circuit Q for the loop;
said circuit loop having a circuit branch including said capacitance and a resistor coupled in said branch for decreasing the Q of the circuit loop from the value $Q_1$ to a lower value $Q_2$;
an electron beam deflection winding coupled between said transformer winding and linearity correction network;
circuit means coupled to said transformer winding and adapted for causing a periodic sawtooth current of frequency $f_h$ to flow in said deflection winding and a periodic current to flow in said resonant circuit loop;
said resonant frequency $f_r$ having a value substantially equal to the frequency $f_h$.

4. An electromagnetic deflection circuit arrangement comprising:
a deflection output transformer having a winding formed of a plurality of turns and including a plurality of terminals disposed along the length of said winding;
a linearity correction network coupled between first and second terminals of the transformer winding and forming a circuit loop with a segment of the winding intermediate the first and second terminals;
said circuit loop having a first branch including a capacitor and resistor and a second branch having an inductor;
said capacitor and inductor adapted to provide series resonance for the circuit loop at a frequency $f_r$;
an electron beam deflection winding coupled between a third terminal of said transformer winding and a junction of said first and second circuit branches;
circuit means coupled to said transformer winding and adapted for causing a periodic sawtooth current of frequency $f_h$ to flow in said deflection winding and a periodic current to flow in said circuit loop;
said resonant frequency $f_r$ having a value substantially equal to the frequency $f_h$.

5. An electromagnetic deflection circuit arrangement comprising:
a deflection output transformer having a winding formed of a plurality of turns and including a plurality of terminals disposed along the length of said winding;
a linearity correction network coupled between first and second terminals of the transformer winding and forming a circuit loop with a segment of the winding intermediate the first and second terminals;
said circuit loop having a first branch including capacitor and resistor coupled in series and a second branch having an inductor;
said capacitor and inductor adapted to provide series resonance for the circuit loop at a frequency $f_r$;
an electron beam deflection winding coupled between a third terminal of said transformer winding and a junction of said first and second circuit branches;
circuit means coupled to said transformer winding and adapted for causing a periodic sawtooth current of frequency $f_h$ to flow in said deflection winding and a periodic current to flow in said circuit loop;
said resonant frequency $f_r$ having a value substantially equal to the frequency $f_h$.

6. An electromagnetic deflection circuit arrangement comprising:
a deflection output transformer having a winding formed of a plurality of turns and including a plurality of terminals disposed along the length of said winding;
a linearity correction network coupled between first and second terminals of the transformer winding and forming a circuit loop with a segment of the winding intermediate the first and second terminals;
said circuit loop having a first branch including a capacitor and a resistor coupled in parallel and a second branch having an inductor;
said capacitor and inductor adapted to provide series resonance for the circuit loop at a frequency $f_r$;
an electron beam deflection winding coupled between a third terminal of said transformer winding and a junction of said first and second circuit branches;
circuit means coupled to said transformer winding and adapted for causing a periodic sawtooth current of frequency $f_h$ to flow in said deflection winding and a periodic current to flow in said circuit loop;
said resonant frequency $f_r$ having a value substantially equal to the frequency $f_h$.

7. An electromagnetic deflection circuit arrangement comprising:
a deflection output transformer having a winding formed of a plurality of turns and including a plurality of terminals disposed along the length of said winding;

a linearity correction network coupled between first and second terminals of the transformer winding and forming a circuit loop with a segment of the winding intermediate the first and second terminals;

said circuit loop having a first branch including a capacitor and an adjustable reactive impedance and a second branch having an inductor;

said capacitor and inductor adapted to provide series resonance for the circuit loop at a frequency $f_r$;

an electron beam deflection winding coupled between a third terminal of said transformer winding and a junction of said first and second circuit branches;

circuit means coupled to said transformer winding and adapted for causing a periodic sawtooth current of frequency $f_h$ to flow in said deflection winding and a periodic current to flow in said circuit loop;

said resonant frequency $f_r$ having a value substantially equal to the frequency $f_h$.

8. An electromagnetic deflection circuit arrangement comprising:

a deflection output transformer having a winding formed of a plurality of turns and including a plurality of terminals disposed along the length of said winding;

a linearity correction network coupled between first and second terminals of the transformer winding and forming a circuit loop with a segment of the winding intermediate the first and second terminals;

said circuit loop having a first branch including a capacitor and an adjustable inductor and a second branch having an inductor;

said capacitor and inductor adapted to provide series resonance for the circuit loop at a frequency $f_r$;

an electron beam deflection winding coupled between a third terminal of said transformer winding and a junction of said first and second circuit branches;

circuit means coupled to said transformer winding and adapted for causing a periodic sawtooth current of frequency $f_h$ to flow in said deflection winding and a periodic current to flow in said circuit loop;

said resonant frequency $f_r$ having a value substantially equal to the frequency $f_h$.

References Cited by the Examiner

UNITED STATES PATENTS 2,905,856 9/1959 Schlesinger ---------- 315—27

DAVID G. REDINBAUGH, *Primary Examiner.*

T. A. GALLAGHER, *Assistant Examiner.*